US010649674B2

(12) United States Patent
Sasidharan et al.

(10) Patent No.: US 10,649,674 B2
(45) Date of Patent: May 12, 2020

(54) EXTENDED CONTROLLER PRE-INITIALIZATION USING BOOT PARTITIONS IN SOLID STATE SYSTEMS

(71) Applicant: Western Digital Technologies, Inc., San Jose, CA (US)

(72) Inventors: Vinod Sasidharan, Bangalore (IN); Rishabh Mahajan, Delhi (IN); Abhishek Mourya, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 172 days.

(21) Appl. No.: 15/970,408

(22) Filed: May 3, 2018

(65) Prior Publication Data

US 2019/0339888 A1 Nov. 7, 2019

(51) Int. Cl.
*G06F 12/00* (2006.01)
*G06F 3/06* (2006.01)
(Continued)

(52) U.S. Cl.
CPC .......... *G06F 3/0632* (2013.01); *G06F 3/0604* (2013.01); *G06F 3/0647* (2013.01);
(Continued)

(58) Field of Classification Search
None
See application file for complete search history.

(56) References Cited

U.S. PATENT DOCUMENTS 8,700,834 B2   4/2014 Horn et al.
8,762,703 B2   6/2014 Galbo et al.
(Continued)

FOREIGN PATENT DOCUMENTS

CN   106569736 A   4/2017
JP   2016103261 A   6/2016

OTHER PUBLICATIONS

NVM Express; "Non-Volatile Memory Express" Revision 1.3a, dated Oct. 24, 2017; 287 pages.

*Primary Examiner* — Jason W Blust
(74) *Attorney, Agent, or Firm* — Loza & Loza, LLP; Gabriel Fitch

(57) ABSTRACT

The present disclosure describes technologies and techniques for use by a data storage controller—such as a controller for use with a NAND device or other non-volatile memory (NVM)—to retrieve configuration information from a NAND boot partition during an initialization procedure initiated by a host. Within illustrative examples described herein, the configuration information stored in the NAND boot partition is provided in addition to configuration information stored within physical layer register sets of the data storage controller. In the examples, the data storage controller is configured for use with versions of Peripheral Component Interconnect (PCI) Express—Non-Volatile Memory express (NVMe) that provide support for NAND boot partitions. In these examples, the use of the NAND boot partition allows an NVM device manufacturer to implement at least some new features in firmware or software within an existing NVM card, without modifying the physical layer registers.

23 Claims, 12 Drawing Sheets

(51) Int. Cl.
*G06F 13/16* (2006.01)
*G06F 13/42* (2006.01)

(52) U.S. Cl.
CPC ........ *G06F 3/0679* (2013.01); *G06F 13/1668* (2013.01); *G06F 13/4282* (2013.01); *G06F 2213/0026* (2013.01)

(56) References Cited

U.S. PATENT DOCUMENTS

| | | |
|---|---|---|
| 9,819,739 B2 | 11/2017 | Hussain et al. |
| 2015/0120770 A1* | 4/2015 | Obukhov .......... G06F 16/24561 707/758 |
| 2017/0090948 A1 | 3/2017 | Waidhofer et al. |
| 2017/0206104 A1 | 7/2017 | Sliwa et al. |
| 2017/0293428 A1 | 10/2017 | Radovanovic |

* cited by examiner

*Further Exemplary operations for use by a Host Device*

1200

1202 — Upon detecting the connection of a removable NVM system to the host device, commence an initialization procedure to retrieve initial configuration information from the physical layer hardware register set of the NVM controller where the initial configuration information corresponds to an initial (first) set of capabilities or features

1204 — Receive the initial configuration information from the physical layer hardware register set of the NVM controller using PCIe without initializing or otherwise enabling the overall NVM data storage system

1206 — Initiate a boot read procedure to retrieve additional configuration information (and any OEM-specific information or parameters) from a NAND boot partition block of the NVM data storage system, where the additional information corresponds to an advanced (second) set of capabilities or features (and which, for example, might include VPD)

1208 — Generate various NVM system initialization or enablement commands based on the initial configuration information, the additional configuration information, and any other information or parameters provided by the NVM system (where at least some of the commands may operate to fine tune or otherwise enhance the functioning of the NVM system based on the OEM-specific information)

1210 — Send the commands to the NVM controller to enable the main processor(s) and/or other processing components of the NVM system and thereby enable and configure both the first and second sets of features or capabilities, including initializing queues and the like

1212 — Commence reading/writing data to/from the NAND via NVMe submission and completion queues and performing other functions

FIG. 12

EXTENDED CONTROLLER PRE-INITIALIZATION USING BOOT PARTITIONS IN SOLID STATE SYSTEMS

FIELD

The subject matter described herein relates to data storage devices and controllers. More particularly, the subject matter relates, in some examples, to the handling of configuration information within data storage controllers for use with non-volatile memory (NVM) devices.

INTRODUCTION

Solid state drive (SSD) data storage devices incorporating non-volatile memories (NVMs), such as flash NAND memories, are replacing or supplementing conventional rotating hard disk drives for mass storage in many consumer electronics and computers. In NVM-based products, a host device such as a videocamera or other portable electronic device includes components for accessing an NVM data storage system, which may be a removable device or flash card. An exemplary NVM system includes an NVM controller and a NAND memory device (hereinafter a "NAND") or other NVM storage device. The NVM controller controls access by the host device to the NAND by, e.g., fetching read and write commands from queues within the host device and executing the commands to read/write data from/to the NAND.

Issues can arise within SSDs involving the provision of configuration information and it would be desirable to provide solutions to these of other issues.

SUMMARY

One embodiment of the present disclosure provides a method for use by a data storage system having data storage controller and a non-volatile memory (NVM) device, including: transferring initial configuration information from a hardware component of the data storage controller to a host device; transferring additional configuration information from a boot partition of the NVM device to the host device; receiving initialization commands from the host device that are based on the initial configuration information and the additional configuration information; and enabling one or more processing components of the data storage system in response to the initialization commands received from the host device.

Another embodiment of the present disclosure provides a data storage system for use with a host device, where the data storage system includes: a non-volatile memory (NVM) device configured to include a boot partition; and a data storage controller including a hardware register configured to store initial configuration information, a first configuration information transference controller configured to transfer the initial configuration information from the hardware register to the host device, a second configuration information transference controller configured to transfer additional configuration information from the boot partition of the NVM device to the host device, and a command reception controller configured to receive commands from the host device based on the initial configuration information and the additional configuration information.

Yet another embodiment of the present disclosure provides a data storage system for use with a host device, where the data storage system includes: a non-volatile memory (NVM) device; and a data storage controller configured to transfer initial configuration information from a hardware component of the data storage controller to the host device, transfer additional configuration information from a boot partition of the NVM device to the host device, receive initialization commands from the host device that are based on the initial configuration information and the additional configuration information, and enable one or more processing components of the data storage system in response to the initialization commands received from the host device.

Still yet another embodiment of the present disclosure provides an apparatus for use with a data storage system having a non-volatile memory (NVM) device, including: means for transferring initial configuration information from a hardware component of the data storage controller to a host device; means for transferring additional configuration information from a boot partition of the NVM device to the host device; means for receiving initialization commands from the host device that are based on the initial configuration information and the additional configuration information; and means for enabling one or more processing components of the data storage system in response to the initialization commands received from the host device.

BRIEF DESCRIPTION OF THE DRAWINGS

The subject matter described herein will now be explained with reference to the accompanying drawings of which:

FIG. 12 is a flow chart summarizing selected operations of a host device or other suitable device configured to process additional configuration information obtained from with a NAND boot partition of a removable NVM data storage system.

DETAILED DESCRIPTION

Figure 1:
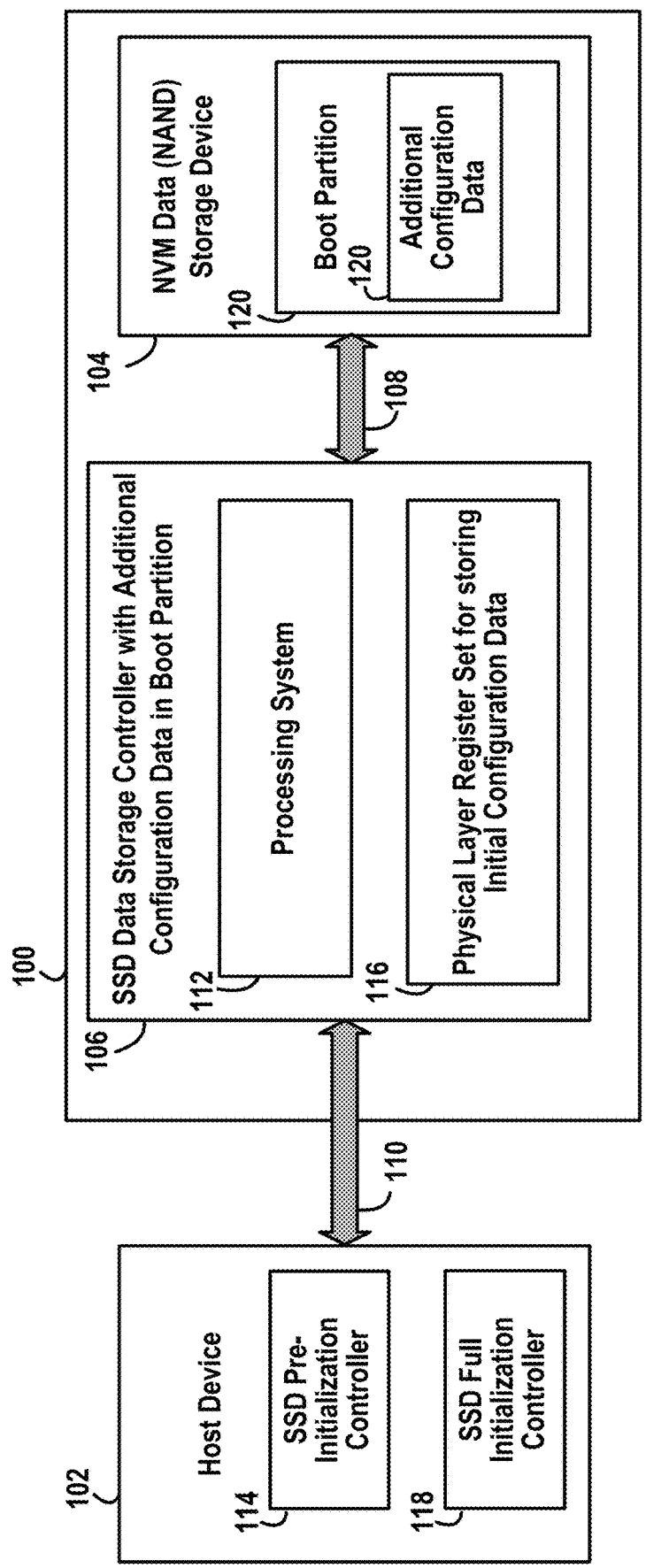
FIG. 1 illustrates an NVM data storage system equipped to store initial configuration information in physical layer hardware sets within a data storage controller and to store additional configuration information in boot partitions within a NAND.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Overview

Aspects of the present disclosure provide various apparatus, devices, systems and methods for use by solid state drive (SSD) or flash data storage systems or cards. The main examples herein relate to removable non-volatile memory (NVM) storage systems configured for use with Peripheral Component Interconnect (PCI) Express—Non-Volatile Memory express (NVMe), wherein an NVM data storage controller (i.e. a device controller) is configured to control access by a host device to a NAND or other NVM device using NVMe protocols. See, for example, the NVM Express standard, Revision 1.3a, Oct. 24, 2017, cited above. (NVM Express and NVMe are trademarks of NVM Express, Inc. PCI Express® and PCIe® are registered trademarks of PCI-SIG.) However, aspects described herein are applicable to other data storage systems or protocols.

Within SSDs, such as those using NVMe, a host device often must fully initialize the NVM system before the host device can access the NAND of the NVM system, where initialization includes obtaining device identification and configuration information from the NVM system, which the host device uses to determine the correct commands and procedures for controlling and accessing the NVM system. The device identification and configuration information may include data specifying the particular model and version of the NVM system, the vendor that manufactured the NVM system, the capabilities of the particular NVM system, etc. Within exemplary PCIe-NVMe-based SSD systems, when a removable NVM SSD system is connected to a host device, the host device obtains configuration information to initialize the NVM system from within a register set within an Application Specific Integrated Circuit (ASIC) of the NVM system (i.e. a register set provided within a physical layer of the system). The host device then fully initializes the NVM system based on the configuration information obtained from the register set. Exemplary PCIe-NVMe-based NVM systems or cards cannot perform any other functions until fully initialized. Hence, within such NVM systems, initialization is restricted to using information obtained from the physical layer register set.

Issues can arise when the applicable specification or standard employed by NVM system or card is changed or upgraded. Within exemplary PCIe-NVMe-configured systems, the register set is predefined and cannot be modified or extended via changes in device firmware. Hence, certain upgrades in the standards may not be accommodated via a firmware update. And so, if the specification for PCIe-NVMe is updated to include new features that cannot be configured using the existing register set of the NVM system, those new features cannot be used unless the ASIC is modified, which cannot be performed via a firmware upgrade. Thus, to accommodate the exemplary PCIe-NVMe specification upgrade, a new ROM or ASIC tape out may be required (where "tape-out" is the final result of the design process for ROM-based or ASIC-based NVM controllers before they are sent for manufacturing). Such a hardware re-design may also be referred to as "re-spinning" the ROM or ASIC, and it can be costly for the NVM system or card manufacturer.

Hence, a new feature or capability that might be easily implemented via firmware or software in an NVM system cannot be so deployed simply because the new feature cannot be communicated to the host during initialization, since the pre-defined register set used during initialization does not accommodate the new feature. One such example involves CFExpress™, which is a standard for removable media cards proposed by the CompactFlash Association. One proposed CFExpress specification allows for the host device to read Vital Product Data (VPD) through a PCIe-PHY layer during initialization. However, the physical layer register sets of many existing PCIe-NVMe controllers do not accommodate VPD and so CI-Express may not be implemented within such controllers without an ASIC re-spin. Manufacturers would much prefer to re-use existing PCIe-NVMe controllers rather than to redesign and re-spin the controllers, and so the configuration limitations of a previous controller design might be carried forward for new storage cards. Since there is no VPD capability in the earlier cards, the VPD capability might be omitted for the new devices as well, since it may be too expensive or burdensome to redesign and re-spin the ASIC.

Thus, issues may arise when PCIe-NVMe standards or specifications change to provide new features or capabilities. Unless the new features can be communicated by the NVM controller to a host device via existing and pre-defined hardware registers during initialization, the features cannot be used without redesigning and re-spinning the ASIC or ROM of the NVM controller.

However, in accordance with techniques described herein, these or other issues may be addressed within PCIe-NVMe-based systems or cards by storing additional configuration information (identifying the new features) within a boot partition of the NAND, which can be accessed by the host device without first requiring the NVM controller to be initialized. (Boot partitions provide an area within the NVM system that can be read without the host initializing queues or enabling the controller.) Since the host device can access the boot partition area of the NAND using PCIe-NVMe without the NVM controller of the NVM system (i.e. the SSD card) being initialized and enabled, the NVM system can thereby notify the host device that it is capable of performing various new features accommodated by the PCIe-NVMe specification via the information stored in the boot partition. Hence, the register set of the NVM controller need not be redesigned to accommodate the new feature, and so no ROM or ASIC re-spin is required to accommodate the new feature.

Using these techniques, so long as the NVM device manufacturer can implement the new feature in firmware and/or software within an existing NVM card, the new feature can be implemented within the existing NVM card design even though the pre-defined register set does not accommodate the new features. That is, rather than changing the hardware register set, the boot partition of the NAND is changed to store whatever additional configuration information is required to inform the host that the NVM card is capable of performing the new feature, so that the host device can then use that information as part of its overall initialization process and enable and use the new feature. Moreover, by storing the additional configuration information in the NAND boot partition, the additional configuration information can be read by the host device before the NVM card is fully initialized. Using these techniques, the NVM card need not be redesigned to change the register set to accommodate the new feature (which, as noted, would likely require redesigning and re-spinning the ROM or ASIC).

In the case of CFExpress™, Vital Product Data (VPD) may be stored in the NAND boot partition, which the host device retrieves and processes before completing the overall initialization procedure to initialize and configure the NVM system (i.e. the SSD card). And so VPD features may be accommodated within an NVM system even though the pre-defined registers of the physical layer of the NVM controller do not accommodate VPD. Note that these boot partition-based procedures may require that the NVM vendor and the host device designers agree in advance on the proper format, structure and content of information to be stored in the boot partition. This will allow the designers of the host device to provide drivers or other suitable components for retrieving the configuration information stored in the boot partition. In addition to providing additional configuration information in the boot partition, the boot partition might also provide original equipment manufacturer (OEM)-specific information that the host can use to fine-tune the performance of the NVM system or its various components.

Exemplary Data Storage Controller Embodiments

FIG. 1 illustrates, at a high level, an SSD data storage system 100 configured to control access to an NVM data storage device (such as a NAND) 104 by a host device 102. After the SSD has been connected to the host device and once the SSD has been fully initialized, the data storage system 100 may receive data from the host device 102 for NAND write operations and store the data in the data storage device 104 under the control of an SSD data storage controller 106 (which may also be referred to as a memory controller or device controller). The data storage system 100 may also obtain data from the data storage device 104 in response to NAND read commands and transfer the data to the host device 102 (also under the control of an SSD data storage controller 106). Data and commands may be routed between the data storage controller 106 and the data storage device 104 along an internal bus 108. Data and commands may be routed between the host device 102 and the data storage controller 106 along an external bus 110. These operations may be performed under the control of a processor or processing system 112, which may include hardware, software and firmware components.

Before the reading and writing of data to/from the NAND may commence, the host device 102 performs an initialization procedure to initialize and configure the NVM system 100, during which (as already noted) the host device 102 determines the identity and capabilities of the NVM system 100 so as to properly enable its various features and functions. In the example of FIG. 1, the host device 102 includes an SSD pre-initialization controller 114, which accesses a set of pre-defined registers, i.e. a physical layer register set 116, in the NVM controller 106 (via bus 110 and various intervening components, such as a PCIe/MAC/PHY interface, discussed below) to obtain initial configuration information or data for beginning the overall initialization procedure. The host device 102 also includes, in the example of FIG. 1, an SSD full initialization controller 118, which accesses a boot partition 120 (again via bus 110 and various intervening components, such as a PCIe/MAC/PHY interface) in the NAND 104 to obtain additional configuration information or data for completing the overall initialization procedure. Once the overall initialization procedure is complete, any NVM device features specified or configured by the data in the register set 116 and in the boot partition 120 may be enabled by the host device 102. By "enabling" features or capabilities, it is meant that the data storage system starts, initializes, activates, switches on, actuates, calls up, and/or invokes the features, which may involve starting software, hardware, and/or firmware components, as appropriate depending on the particular feature or capability being enabled.

The initial configuration data stored in the register set 116 may be, for example, configuration data corresponding to an initial set of features specified in a first version (e.g. Version 1) of a particular NVM Standard or Specification document. The additional configuration data stored in the boot partition 120 may be, for example, configuration data corresponding to one or more additional features specified in a second version (e.g. Version 2) of the particular Standard or Specification document (where the additional features of Version 2 could not be specified within the register set 116, which were pre-defined in hardware based on the requirements of Version 1). The processing system 112 is configured to implement both the initial set of features (specified in the register set 116) and the additional features (specified in the boot partition 120). The initial set of features of Version 1 may be implemented by the processing system 112 (or other components of the controller 106) in hardware, firmware or software. The additional features of Version 2 are implemented by the processing system 112 (or other components of the controller 106) in either software or firmware.

In this manner, at least some new or different features of the exemplary Version 2 of the applicable specification can be implemented by an NVM device manufacturer via software or firmware upgrades to an existing NVM device hardware design, without needing to redesign and re-spin hardware components of the NVM device to change the registers 116.

Figure 2:
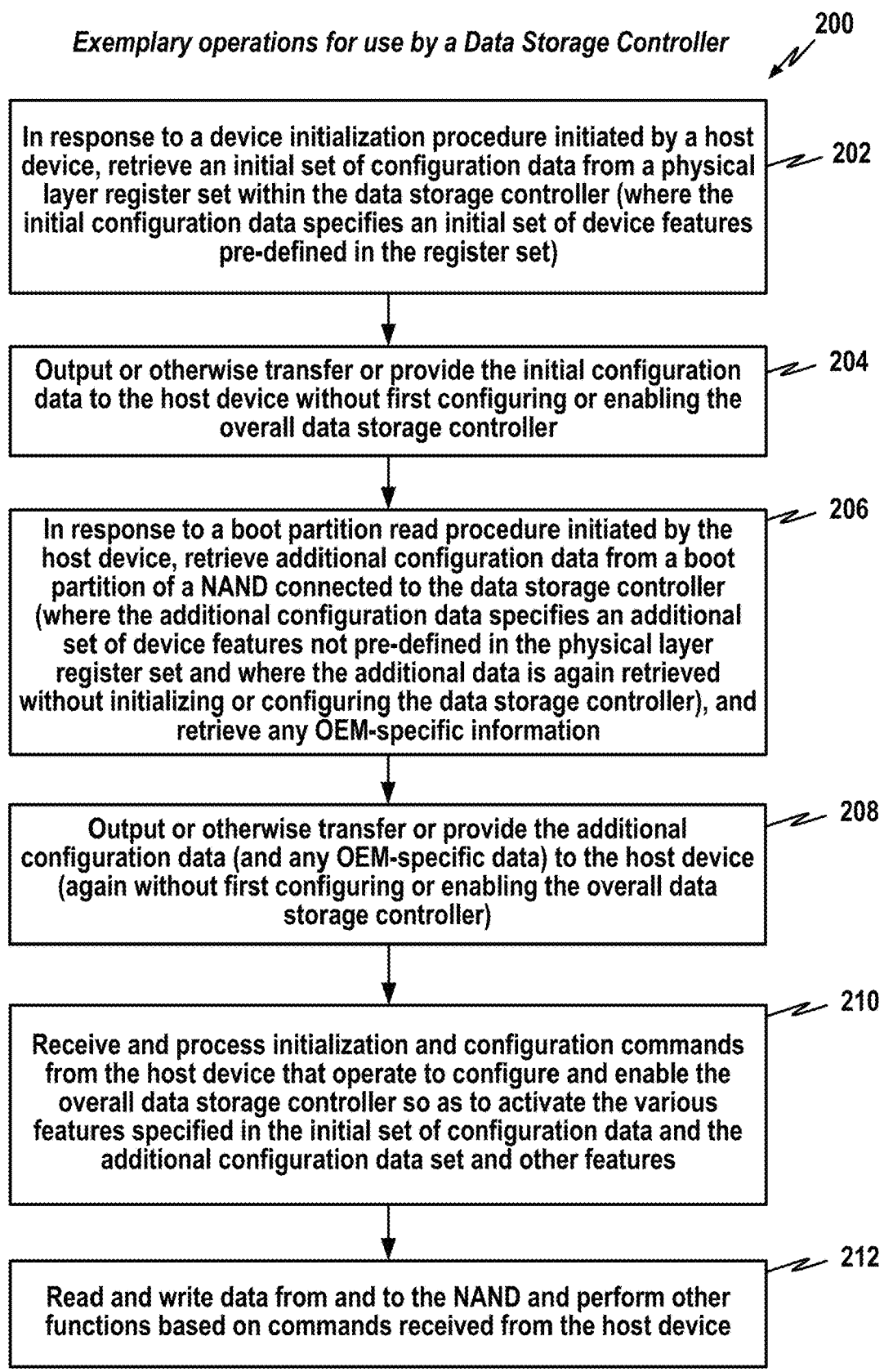
FIG. 2 is a flow chart summarizing the operations of an NVM data storage controller to transfer both initial configuration information and additional configuration information to a host device as part of an overall initialization procedure.

FIG. 2 summarizes some of these features via a flowchart 200 that illustrates operations of a data storage controller. Briefly, at 202, in response to a device initialization procedure initiated by a host device, the data storage controller retrieves an initial set of configuration data from a physical layer register set within the data storage controller (where the initial configuration data specifies an initial set of device features pre-defined in the register set). In a PCIe-NVMe example, the register data may be read via a PCIe MAC PHY interface, without requiring operations by the software or firmware of the data storage controller (which may not yet been activated since the data controller is not yet initialized). At 204, the data storage controller outputs (or otherwise transfers or provides) the initial configuration data to the host device without first configuring or enabling the overall data storage controller. In a PCIe-NVMe example, the register data may be output via the PCIe MAC PHY interface, again without requiring operations by the software or firmware of the data storage controller.

At 206, in response to a boot partition read procedure initiated by the host device, the data storage controller retrieves additional configuration data from a boot partition of a NAND connected to the data storage controller (where the additional configuration data specifies an additional set of device features not pre-defined in the physical layer register set and where the additional data is retrieved without initializing or configuring the data storage controller). In a PCIe-NVMe example, the boot data may be read using a ROM boot loader without requiring operations by the software or firmware of the data storage controller. In additional, at 206, the data controller retrieves any OEM-specific information stored in the boot partition, that the host might be configured to use to fine-tune NVM system performance.

At 208, the data storage controller outputs the additional configuration data (and any OEM-specific information) to the host device (again without first configuring or enabling the overall data storage controller). In the PCIe-NVMe example, this again may be performed PCIe MAC PHY interface. At 210, the data storage controller receives and processes initialization and configuration commands from the host device that operate to configure and enable the overall data storage controller so as to activate the various features specified in the initial set of configuration data and the additional configuration data set and other features. If OEM-specific data was provided to the host, the host device may use that data to configure the NVM system to fine-tune its performance or to achieve other goals. At 212, the data storage controller then reads and writes data from and to the NAND and performs other functions based on commands or NVM access requests received from the host device.

Figure 3:
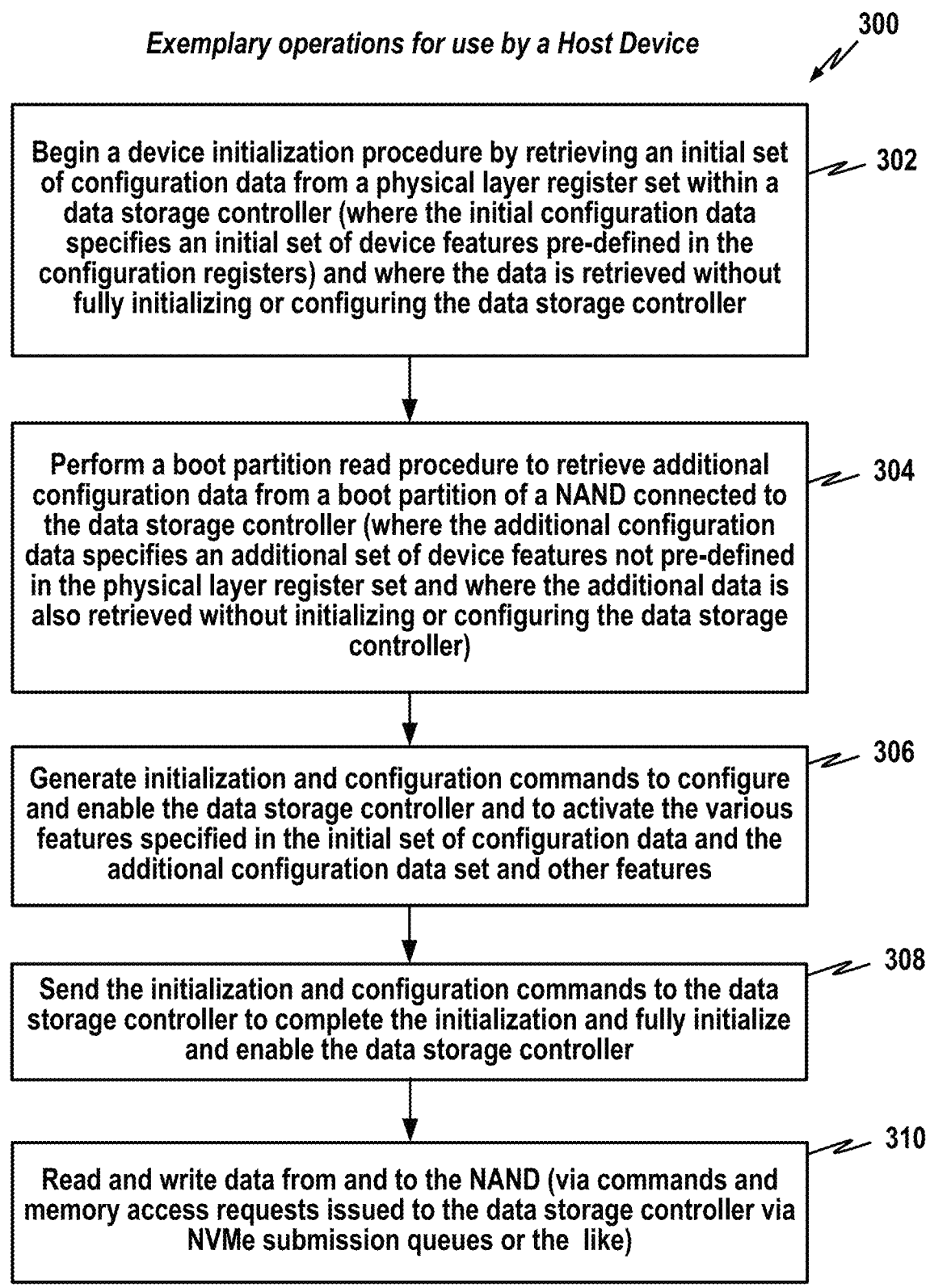
FIG. 3 is a flow chart summarizing the operations of the host device to retrieve both the initial configuration information and the additional configuration information from the NVM data storage system as part of the overall initialization procedure.

FIG. 3 summarizes some of these features via a flowchart 300 that illustrates operations of the host device. Briefly, at 302, the host device begins a device initialization procedure by retrieving an initial set of configuration data from physical layer register set within a data storage controller (where the initial configuration data specifies an initial set of device features pre-defined in the configuration registers) and where the data is retrieved without fully initializing or configuring the data storage controller. At 304, the host device performs a boot partition read procedure to retrieve additional configuration data from a boot partition of a NAND connected to the data storage controller (where the additional configuration data specifies an additional set of device features not pre-defined in the physical layer register set and where the additional data is also retrieved without initializing or configuring the data storage controller). At 306, the host device generates initialization and configuration commands to configure and enable the data storage controller and to activate the various features specified in the initial set of configuration data and the additional configuration data set and other features. At 308, the host device sends the initialization and configuration commands to the data storage controller to complete the initialization procedure and fully initialize and enable the data storage controller. At 310, the host device reads and writes data from and to the NAND (via commands and memory access requests issued to the data storage controller via NVMe submission queues or the like).

Figure 4:
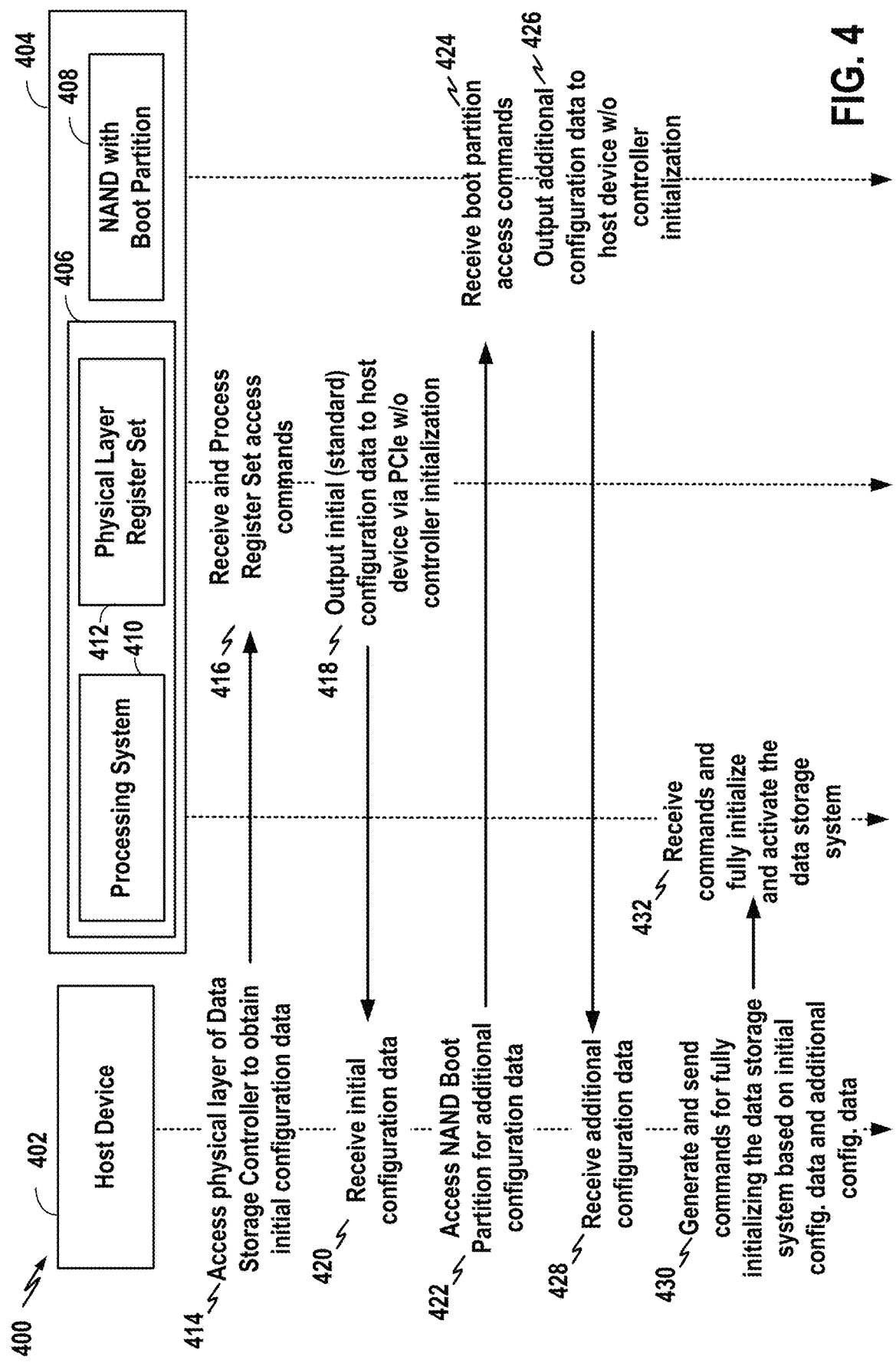
FIG. 4 is a timing diagram summarizing exemplary procedures for use by a data storage system and a host device, where the data storage system has a NAND with a boot partition configured to store additional configuration information.

FIG. 4 provides a timing diagram 400 illustrating an exemplary sequence of operations performed by components of an overall computing system that includes a host device 402 and an NVM data storage system 404, where the data storage system 404 includes a data storage controller 406 and a NAND 408. The data storage controller 406 includes a processing system 410 (which may include hardware, software and firmware). The data storage controller 406 also includes a physical layer register set 412. As already explained, the NAND 408 may be configured to include a boot partition (also shown in FIG. 1).

Beginning at 414, the host device accesses a physical layer of the data storage controller to obtain the initial configuration data. At 416, in response, the register set 412 of the data storage controller 406 receives and processes the register set access commands and, at 418, the register set 412 outputs initial (standard) configuration data to the host device 402 via PCIe (or other appropriate protocols, procedures or interfaces) without controller initialization. At 420, the host device receives the initial configuration data for use in initializing the data storage controller. At 422, the host device then accesses the boot partition of the NAND 408 for additional (advanced) configuration data. At 424, the NAND 408 receives the boot partition commands and, at 426, outputs the additional configuration data to the host device (again without controller initialization). The additional configuration data is received by the host device 402 at 428. At 430, the host device generates and sends commands to the data storage controller 406 for fully initializing the data storage system 404 based on the initial configuration data and the additional configuration data. At 432, the processing system 410 receives the commands and fully initializes and activates the data storage system 404, including activating any commands or capabilities specified in the additional configuration data (which, as explained above, are implemented in software and/or firmware).

Using these techniques, new features or capabilities can be implemented by the NVM device manufacturer via software/firmware upgrades to existing hardware designs, without the need to redesign and re-spin the ASIC/ROM of the NVM device design. As can be appreciated, whether any particular new feature of an applicable standard (such as a new feature of the NVMe specification) can be implemented in software or firmware within an NVM system without changing the hardware depends on the particular feature and its functions and requirements. At least some new features may require a hardware upgrade (in addition to any needed software/firmware upgrades) and, if so, a hardware design may be necessary. In such cases, the hardware of the NVM data storage controller design is modified by engineers/designers to address the new feature. However, for any new or modified feature that can be implemented in the NVM system without a hardware upgrade to the NVM controller (i.e. where the only hardware upgrade that would otherwise be needed is to the physical layer register set and not the processor), the provision of additional configuration data in the NAND boot partition may obviate the need to redesign/re-spin the hardware of the NVM controller.

Hence, for each revision to a specification or standard involving features specified during device initialization in the physical layer register set of the device, the engineers/designers of the NVM data storage controller may review the particular changes in the specification to determine if the changes can be accommodated via software and/or firmware upgrades without hardware changes. If the changes can be accommodated, the engineers/designers reprogram the software and/or firmware accordingly and update the data stored in the boot partition of the NAND to alert host devices of the features during initialization, thus avoiding the need to change the hardware of the NVM data storage controller merely to update the physical layer register set. If any changes cannot be so accommodated, the engineers/designers may instead redesign the hardware as needed (while also reprogramming the software and/or firmware, if needed, to conform to the new hardware).

Using this general strategy, over the lifecycle of a particular standard, several revisions (perhaps spanning a period of many years) might be accommodated in a data storage controller via software/firmware upgrades before a hardware upgrade might be needed to accommodate more significant hardware changes. For some standards, and for some devices, all revisions might be accommodated in this manner over the lifetime of the standard.

Figure 5:
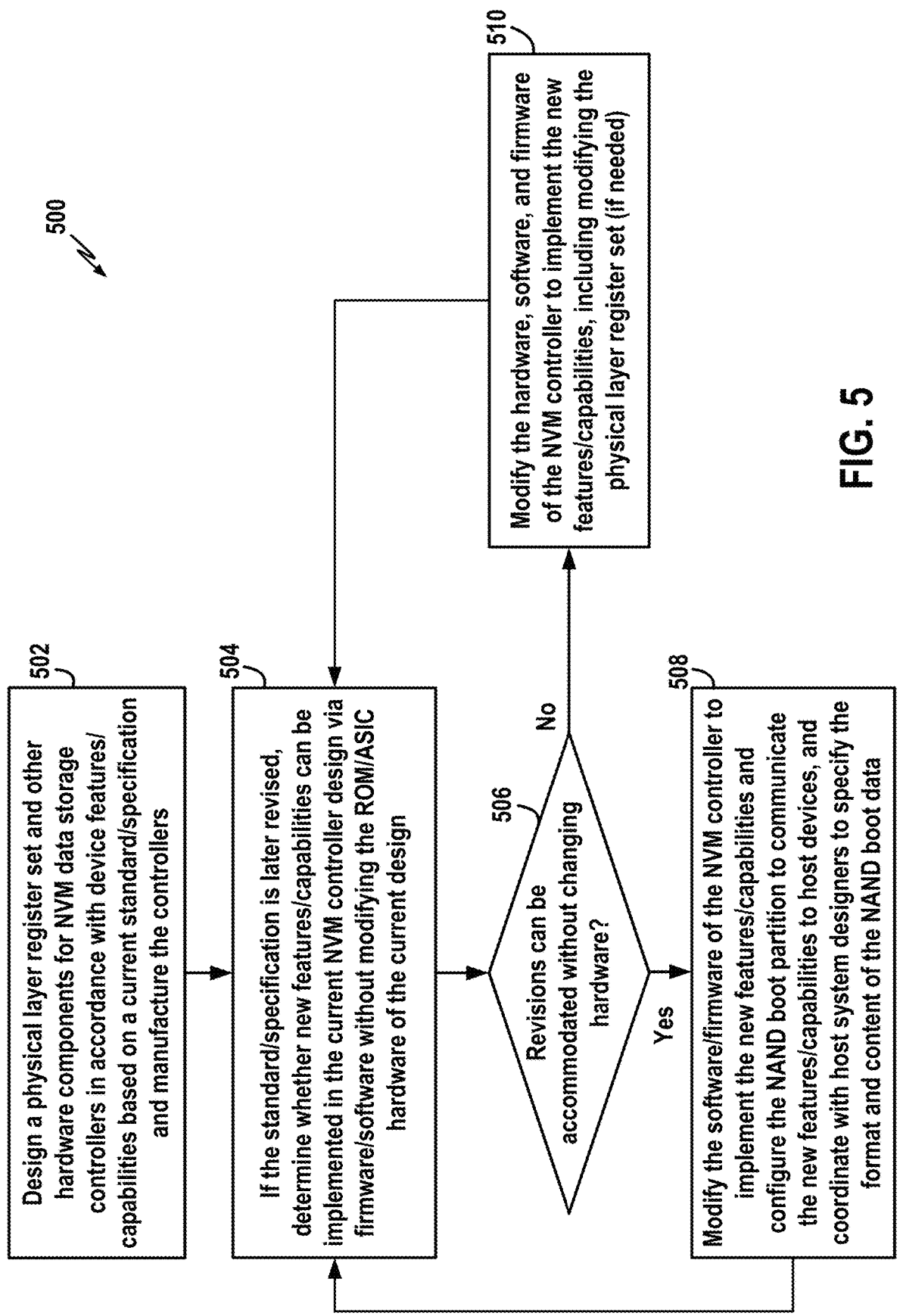
FIG. 5 is a flow chart summarizing an overall procedure for exploiting NAND boot partitions over the lifecycle of a NVM data storage product to accommodate revisions to a particular NVM standard via software/firmware upgrades rather than hardware modifications.

FIG. 5 summarizes this overall revision strategy via flowchart 500. Briefly, at 502, engineers/designers at a company that builds NVM data storage controllers work to design the physical layer register set and other hardware components of the controller in accordance with device features/capabilities based on a current standard/specifications (such as CFExpress specifications) and then manufacture and deploy the NVM controllers. These engineers/designers may be referred to as the "device team." If the standard/specification is later revised (e.g. from a Version 1 to a Version 2), the device team engineers/designers then determine, at 504, whether new features/capabilities of the standard can be implemented in the current NVM controller design via firmware/software without modifying the ROM/ASIC hardware of the current NVM controller design. As part of this analysis, the device team engineers/designers determine whether the NAND boot partition can be used to communicate the new features/capabilities to host devices without modifying the physical layer register set. This may include coordinating with the engineers/designers of host systems to ensure compatibility between the NVM device and host systems. The engineers/designers of host systems may be referred to as the "host team."

If the new features/capabilities can be accommodated without changing the NVM controller hardware, as determined at decision block 506, the device team engineers/designers modify the software/firmware of the NVM controller, at 508, to implement the new features/capabilities and configure the NAND boot partition to communicate the new features/capabilities to host devices. At 508, the engineers/designers of the NVM controller coordinate with the host team engineers/designers to specify the format, structure and content of the NAND boot partition data. On the other hand, if at least one new feature/capability cannot be accommodated via changes to NVM controller software/firmware without changing the NVM controller hardware, then, at 510, the device team engineers/designers modify the hardware (and software and/or firmware, if needed) of the NVM controller to implement the new features/capabilities, including modifying the physical layer register set (if such a modification is needed to conform to the latest specifications/standards). In this case, the new features/capabilities need not be communicated to the host via the NAND boot partition since the register set will be modified per the standard. This may require a new ROM/ASIC tape out.

Exemplary NVMe Embodiments

Figure 6:
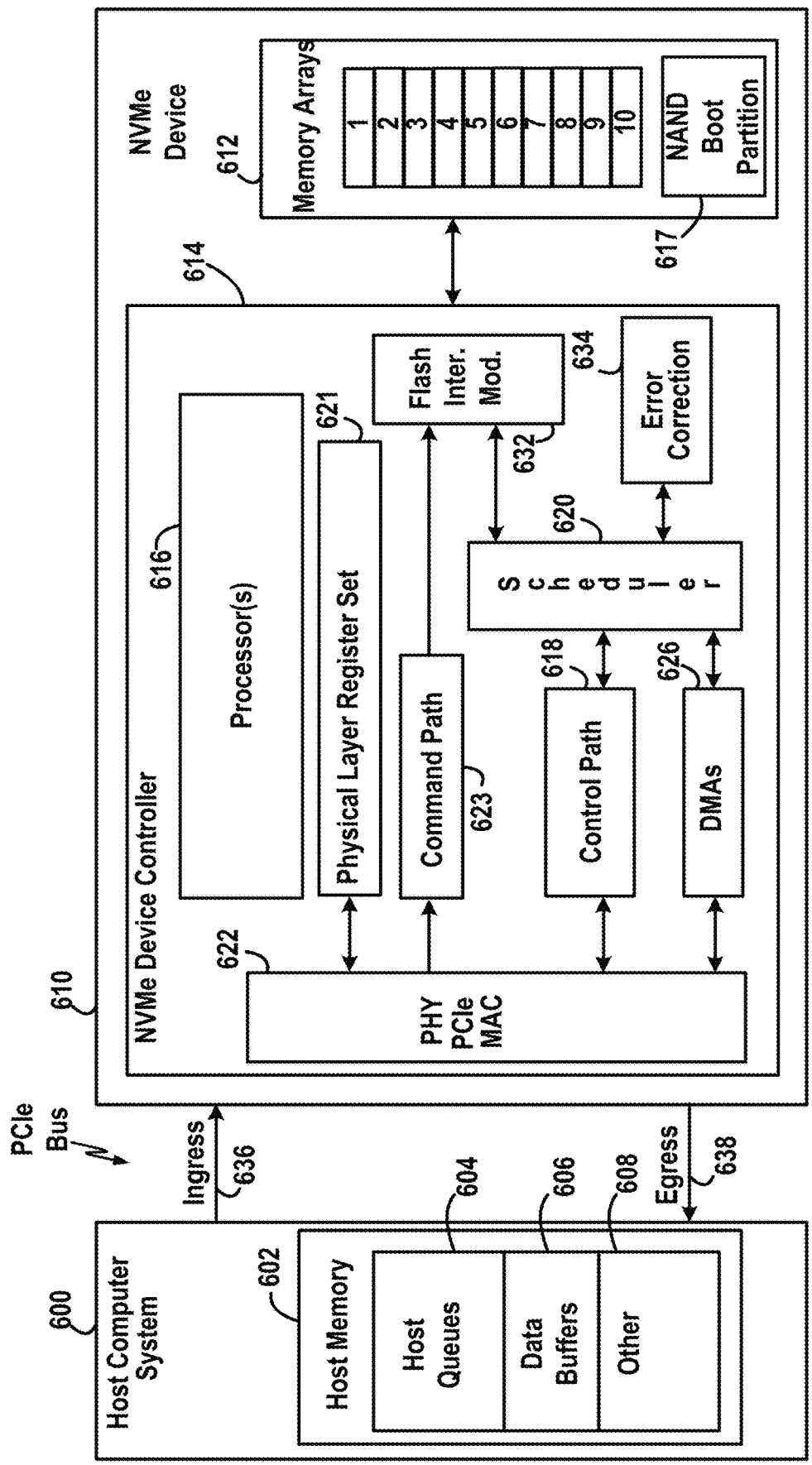
FIG. 6 illustrates a data storage system equipped for use with NVMe, where the system stores initial configuration data in physical layer register set and additional configuration data in a NAND boot partition.

FIG. 6 illustrates selected features of an exemplary NVMe architecture in which the above-described procedures and components may be implemented. In FIG. 6, a host device 600 may be any suitable computing platform capable of accessing memory on a storage device using NVMe procedures or protocols that provide for a boot partition (such as NVMe Revision 1.3 or compatible NVMe Revisions or Versions). For example, host device 600 may be a desktop personal computer, a laptop computer, a tablet computer, a mobile telephone, or a front end to a storage array. The host device 600 includes internal host memory 602, which in this example includes host submission and completion queues 604, data buffers 606 and other memory components 608.

The host device 600 may store data in an NVMe storage device 610. The NVMe device 610 may be any suitable device that provides non-volatile memory storage for host device 600 in accordance with NVMe standards. For example, the NVMe device 610 may be a removable storage device, such as an SSD that is removably connectable or removably connectable or coupleable to host device 600. The host device 600 and the NVMe device 610 of FIG. 6 are communicatively connected via a PCIe bus (represented via ingress 636 and egress 638). Communication with the host device 600 using the PCIe bus may be performed or facilitated using a PHY/PCIe/MAC interface 622.

The NVMe storage device 610 of FIG. 6 includes an NVMe controller 614 and a non-volatile memory 612. The NVMe device controller 614 (which may also be referred to herein as a data storage controller) controls access to the non-volatile memory 612 (such as a NAND). The NVMe controller 614 thus may be a non-volatile memory controller that implements or supports the NVMe protocols, and non-volatile memory 612 may be 2D or 3D NAND flash memory. The NVMe controller 614 includes one or more processors 616 that include components for controlling the operations of the NVM device, once it is connected to a host and properly initialized. (Although not shown, separate ROM may be used to store software and/or firmware including boot load firmware, boot partition access firmware, etc.). The processor(s) 616 are also responsible for the execution of Frond-End and Back-End tasks.

During a first PCIe (pre-initialization) phase of an initialization procedure, the host system 600 first accesses a physical layer register set 621 to obtain initial (pre-defined) configuration parameters, as already discussed. In FIG. 6, the register set 621 is shown as a separate component of the NVM controller 614 but the register set might be a subcomponent of other features of the NVM controller, such as the PCIe MAC PHY interface 622. During a second (full initialization) phase of the initialization procedure, the host system 600 accesses a NAND boot partition 617 to obtain additional configuration parameters. As already explained, the device team of the vendor of the NVM device 610 coordinates with the host system designers to coordinate the format and content of the additional configuration data so that the host system can properly access and process the data, and complete the device initialization.

Once the NVM device 610 is fully initialized, a command path 623 is then responsible for fetching and parsing commands from the host 600 and queuing the commands internally. Fetching and parsing may involve obtaining submission requests from a submission queue of the host queues 604 and routing those requests to a flash interface module 632. In addition, the command path 623 is responsible for the arbitrating and executing the commands A control path 618 is responsible for handling control messages delivered from the host 600 to the device 610 and vice versa. Among other functions, the control path 618 includes a completion queue manager (not shown) that routes completion entries received from a scheduler 620 to a completion queue within host queues 604 of the host device 600 via the PCIe MAC PHY interface 622. Actual pages of data to be delivered to the host device 600 (such as the result of read commands from arrays 612) are delivered using one or more DMAs 626. Additional components of the NVMe controller 614 include the flash interface module 632, which is responsible for controlling and accessing the memory arrays 612, and an error correction module 634, which is responsible for error correction. Ingress and egress from the NVMe device 610 via the PCIe bus is illustrated via arrows 636 and 638, as indicated above.

Figure 7:
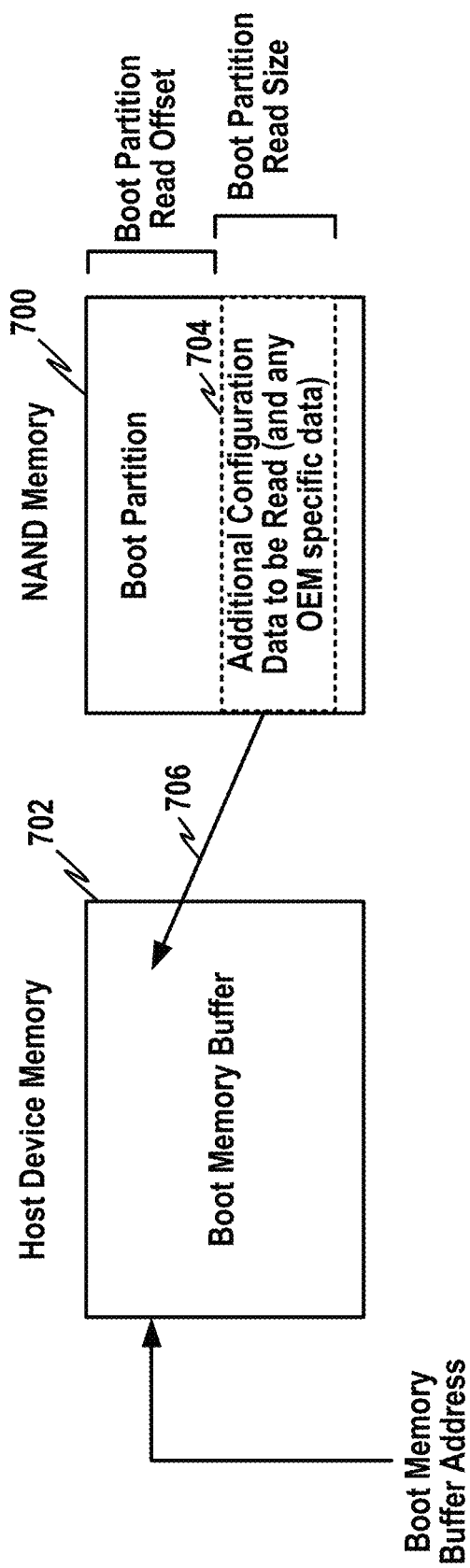
FIG. 7 illustrates NAND memory and host memory, where the NAND memory includes a boot partition with additional configuration data to be read by the host device.

Insofar as the boot partition 617 is concerned, and as explained in NVMe Revision 1.3, a boot partition (which is an optional feature of the NVMe specification) provides an area of NVM storage that can be read without the host device initializing queues (such as submission or completion queues) or enabling the data storage controller. The boot partition is a continuous block of data. A simplified interface is provided to access the boot partition for use with platform initialization code (e.g., a bootloader executed from host ROM) to boot to a pre-operating system (OS) environment rather than storing the image on another storage medium (e.g., a serial peripheral interface (SPI) flash). Two boot partitions of equal size are specified. With two boot partitions, the host device may update one and verify the contents before marking the boot partition as active. With NVMe Revision 1.3, the contents of boot partitions are modified, for example, using Firmware Commit commands FIG. 7 illustrates an exemplary NVMe boot partition 700, along with a boot memory buffer 702 of host memory. The boot partition 700 includes the additional configuration data 704 to be read (and any OEM-specific data), which can be transferred (as shown by arrow 706) into the boot memory buffer 702 to a particular boot memory buffer address. The figure also shows a boot partition read offset and the boot partition read size. As described in NVMe Revision 1.3, the host device allocates the boot memory buffer 702 in host memory for the data storage controller to copy contents from the boot partition 700 (so as to read the contents of the boot partition). The read proceeds with the host (a) initializing a Boot Partition Memory Buffer Base Address and then (b) setting a Boot Partition ID, Boot Partition Read Size, and Boot Partition Read Offset to initiate the Boot Partition read operation. The host device may read from the boot partition 700 until the entire boot partition has been read. A portion of the boot partition 700 may be read by the host any time the NAND is powered (i.e., whether or not the data storage controller connected to the NAND is enabled). Note that, in accordance with the NVMe Revision 1.3 specifications, the host device does not modify any PCIe registers, nor reset or shutdown the device controller while a boot partition read is in progress. Additional details of a boot partition read are provided in Section 8.13.1 of the NVMe Revision 1.3 document, cited above. Procedures for writing to the boot partition are described in Section 8.13.2 of the document, and the write procedures may be exploited or modified, as appropriate, to allow the data storage controller to write data to the boot partition, if appropriate.

As already explained, the host device can read the additional configuration data from the NAND boot partition directly by using NVMe boot partition read methods (as discussed in NVMe Revision 1.3). The boot ROM code handler may provide the data to the host device for a boot partition read through the boot partition allocated in NAND flash.

Figure 8:
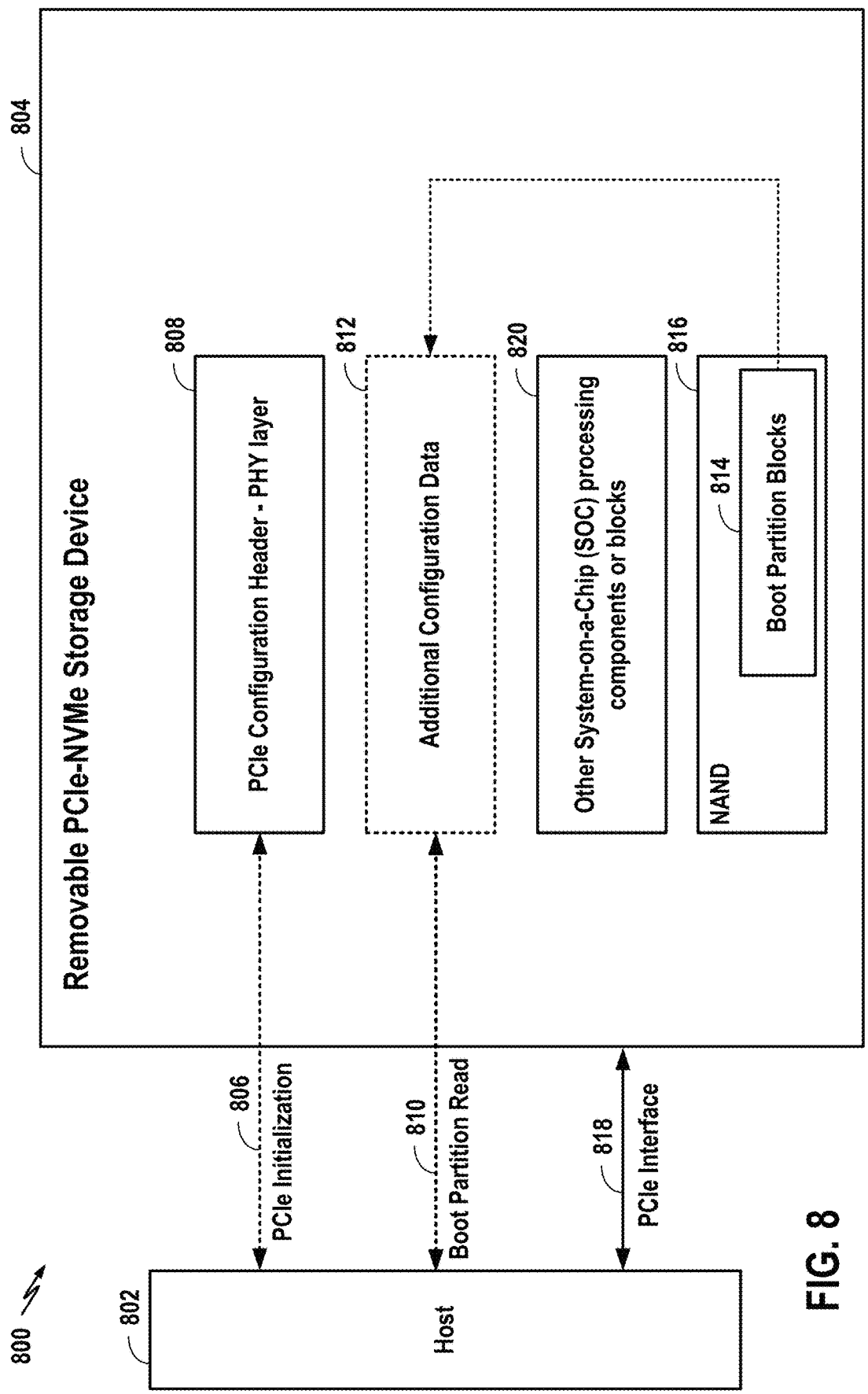
FIG. 8 is a block diagram summarizing selected features of a PCIe-NVMe storage device configured to store additional configuration information in a NAND boot partition.

FIG. 8 illustrates some of these features via an alternative and block diagram that highlights PCIe features. An overall host/device system 800 includes a host 800 and a removable PCIe-NVMe storage device 804. During a PCIe initialization phase 806 (also referred to herein as pre-initialization), the host obtains the initial pre-defined configuration data from a PCIe configuration header 808. During a boot partition read phase 810, the host obtains additional configuration data 812 from boot partition blocks 814 of a NAND 816. The host 802 uses the additional configuration data along with the initial configuration data to complete the initialization, which may include forwarding/receiving signals along PCIe interface 818 to/from other system-on-a-chip (SoC) processing components or blocks 820.

Exemplary initialization procedures for use with NVMe are described, for example, in Section 7.6.1 of the NVMe Revision 1.3 document. These procedures may be modified as appropriate to accommodate the additional configuration information available in the NAND boot partition. As described in that section the host performs the following actions in sequence to initialize the controller to begin executing commands:

1. Set PCI and PCI Express registers based on the system configuration, including power management features. A single interrupt is used until the number of I/O Queues is determined.
2. The host waits for the controller to indicate that any previous reset is complete.
3. An Admin Queue is configured.
4. The controller settings are configured, including
   a. An arbitration mechanism is selected
   b. A memory page size is initialized
   c. An I/O Command Set is selected
5. The controller is enabled by setting an enable value $CC_{EN}$ to 1.
6. The host waits for the controller to indicate it is ready to process commands, as indicated when a ready value $CSTS_{RDY}$ is set to '1'.
7. The host determines the configuration of the controller by issuing the Identify command, specifying the Controller data structure. The host determines the configuration of each namespace by issuing an Identify command for each namespace, specifying a Namespace data structure.
8. The host determines a number of I/O Submission Queues and I/O Completion Queues supported using the Set Features command with the Number of Queues feature identifier. After determining the number of I/O Queues, the message signaling interrupt (MSI) and/or MSI-X registers may be configured.
9. The host allocates an appropriate number of I/O Completion Queues based on the number required for the system configuration and the number supported by the controller.
10. The host allocates the appropriate number of I/O Submission Queues based on the number required for the system configuration and the number supported by the controller.
11. If the host wants asynchronous notification of optional events, the host issues a Set Features command specifying events to enable and takes other appropriate actions once the controller signals it is ready.

After performing these steps, the controller may be used for I/O commands.

Thus, systems and procedures have been described that exploit an NVMe boot partition or similar partitions or techniques to permit a host device to retrieve additional configuration information or the like for an NVM device (beyond the data stored in pre-defined physical layer register sets). Among other possible advantages, and depending upon the particular embodiment, these systems and procedures may allow for greater flexibility for the device firmware to add new configuration data sets that can be accessed by the host directly, before NVMe initialization, which is supported by the PCIe layer. These systems/procedures also may be used to send OEM-specific information, which could be used by an OEM host vendor to fine tune the performance of PCIe-NVMe storage devices or other devices that allow for a boot partition read. As explained, when a new configuration data set is added to an applicable standard/specification, the new configuration data may be accommodated using the boot partition (along with a suitable software/firmware update, assuming the features can be implemented via software/firmware without hardware changes). These are just some possible features and advantages of the systems/techniques.

These systems and procedures may be particularly useful within removable data storage devices equipped for PCIe-NVMe, but aspects of the systems and procedures might be exploited in non-removable storage devices as well, and in devices that do not use PCIe-NVMe.

Further Exemplary Methods and Embodiments

FIGS. 9-12 illustrate and summarize various general features of exemplary data storage controllers and methods, or procedures for use with data storage controllers.

Figure 9:
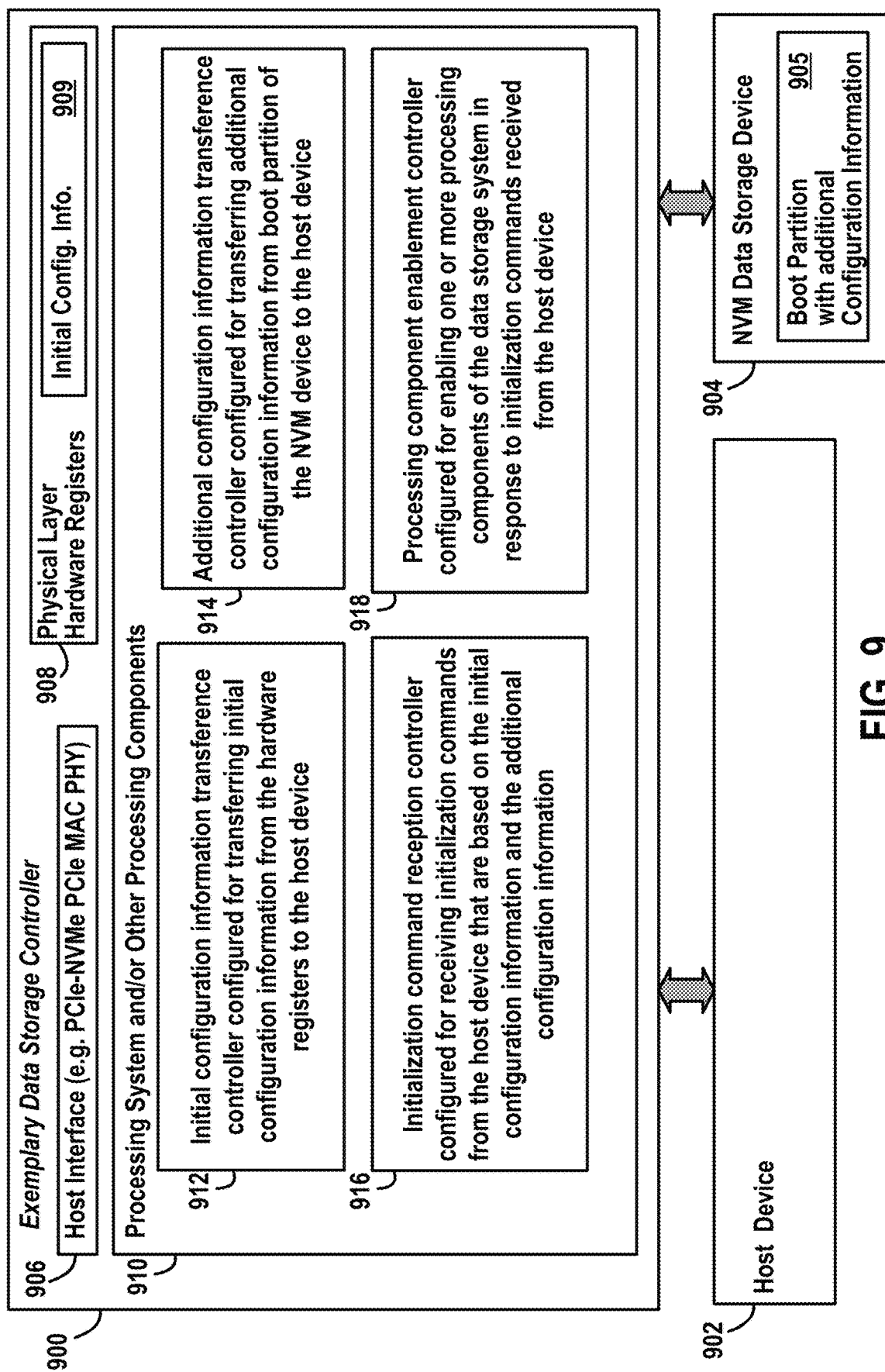
FIG. 9 is a block diagram summarizing selected features of a data storage controller configured for use with an NVM boot partition that stores additional configuration information.

FIG. 9 shows an exemplary data storage controller 900 (or memory controller or device controller) configured to communicate with a host device 902 and a NVM data storage device 904, wherein, once fully initialized, the data storage controller 900 accesses the data storage device 904 based on commands or memory access requests issued to the data storage controller 900 by the host device 902. In the example, of FIG. 9, the NVM data storage device includes a boot partition 905. Although many examples described herein relate to PCIe-NVMe controllers for storing data within NAND devices, the data storage device 904 may be any suitable memory or storage device and is not limited to NANDs, and the data storage controller 900 may be any suitable memory controller device and is not limited to PCIe-NVMe-based controllers.

The exemplary data storage controller 900 of FIG. 9 includes a host interface 906 (such as a PCIe-NVMe PCIe MAC PHY interface) and a set of physical layer hardware registers 908, which include initial configuration information or data 909. The data storage controller 900 also includes a processing system and/or other processing components 910 having an initial (first) configuration information transference controller (or system, device, component or circuitry) 912 configured for transferring initial configuration information from the hardware registers to the host device. An additional (second) configuration information transference controller (or system, device, component or circuitry) 914 is provided for transferring additional configuration information from boot partition of the NVM device to the host device. An initialization command reception controller (or system, device, component or circuitry) 916 is provided for receiving initialization commands from the host device that are based on the initial configuration information and the additional configuration information. A processing component enablement controller (or system, device, component or circuitry) 918 is provided for enabling one or more processing components of the data storage system in response to initialization commands received from the host device.

In at least some examples, means may be provided for performing the functions illustrated in FIG. 9 and/or other functions illustrated or described herein. For example, an apparatus (e.g. data storage controller 900) may be provided for use with a host device (e.g. host 902) and an NVM data storage device (e.g. storage device 904) where the apparatus includes: means (such as component 912) for transferring initial configuration information from a hardware component of the data storage controller to the host device; means (such as component 914) for transferring additional configuration information from a boot partition of the NVM device to the host device; means (such as component 916) for receiving initialization commands from the host device that are based on the initial configuration information and the additional configuration information; and means (such as component 918) for enabling one or more processing components of the data storage system in response to the initialization commands received from the host device. The means for enabling may include means for starting, initializing, activating, switching on, actuating, calling up, and/or invoking the features, which may involve starting software, hardware, and/or firmware components, as appropriate depending on the particular feature or capability being enabled.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. These are just some examples of suitable means for performing or controlling the various functions.

In at least some examples, a machine-readable storage medium may be provided having one or more instructions which when executed by a processing circuit causes the processing circuit to performing the functions illustrated in FIG. 9 and/or other functions illustrated or described herein. For example, instructions may be provided for transferring initial configuration information from a hardware component of the data storage controller to a host device. Additional instructions may be provided for transferring additional configuration information from a boot partition of the NVM device to the host device. Instructions may be provided for receiving initialization commands from the host device that are based on the initial configuration information and the additional configuration information. Still further instructions may be provided for enabling one or more processing components of the data storage system in response to the initialization commands received from the host device.

Figure 10:
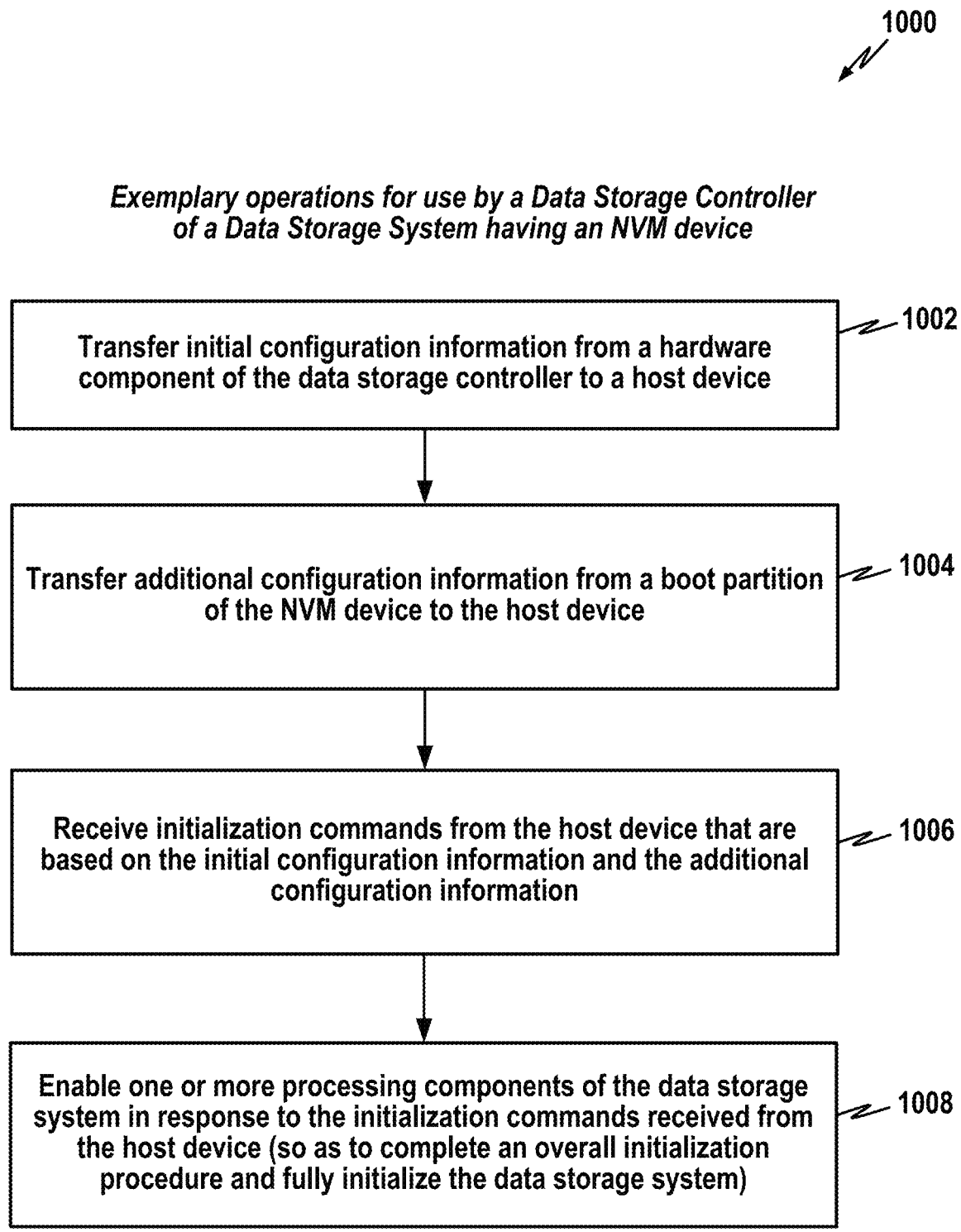
FIG. 10 is a flow chart summarizing selected operations of a data storage controller or other suitable device configured for use with a NVM device boot partition that stores additional configuration information.

FIG. 10 broadly summarizes exemplary operations 1000 for use by or with a data storage system having a data storage controller or other suitable control device and an NVM storage device, such as a NAND. Briefly, at 1002, the data storage controller transfers initial configuration information from a hardware component of the data storage controller to a host device. As explained above, this may involve transferring initial configuration information from a physical layer register set using PCIe. At 1004, the data storage controller transfers additional configuration information from a boot partition of the NVM device to the host device. At 1006, the data storage controller receives initialization commands from the host device that are based on the initial configuration information and the additional configuration information. At 1008, the data storage controller enables one or more processing components of the data storage system in response to the initialization commands received from the host device (so as to complete an overall initialization procedure and fully initialize the data storage system). This may involve enabling the main processor(s) of the data storage system and activating any needed software and/or firmware.

Figure 11:
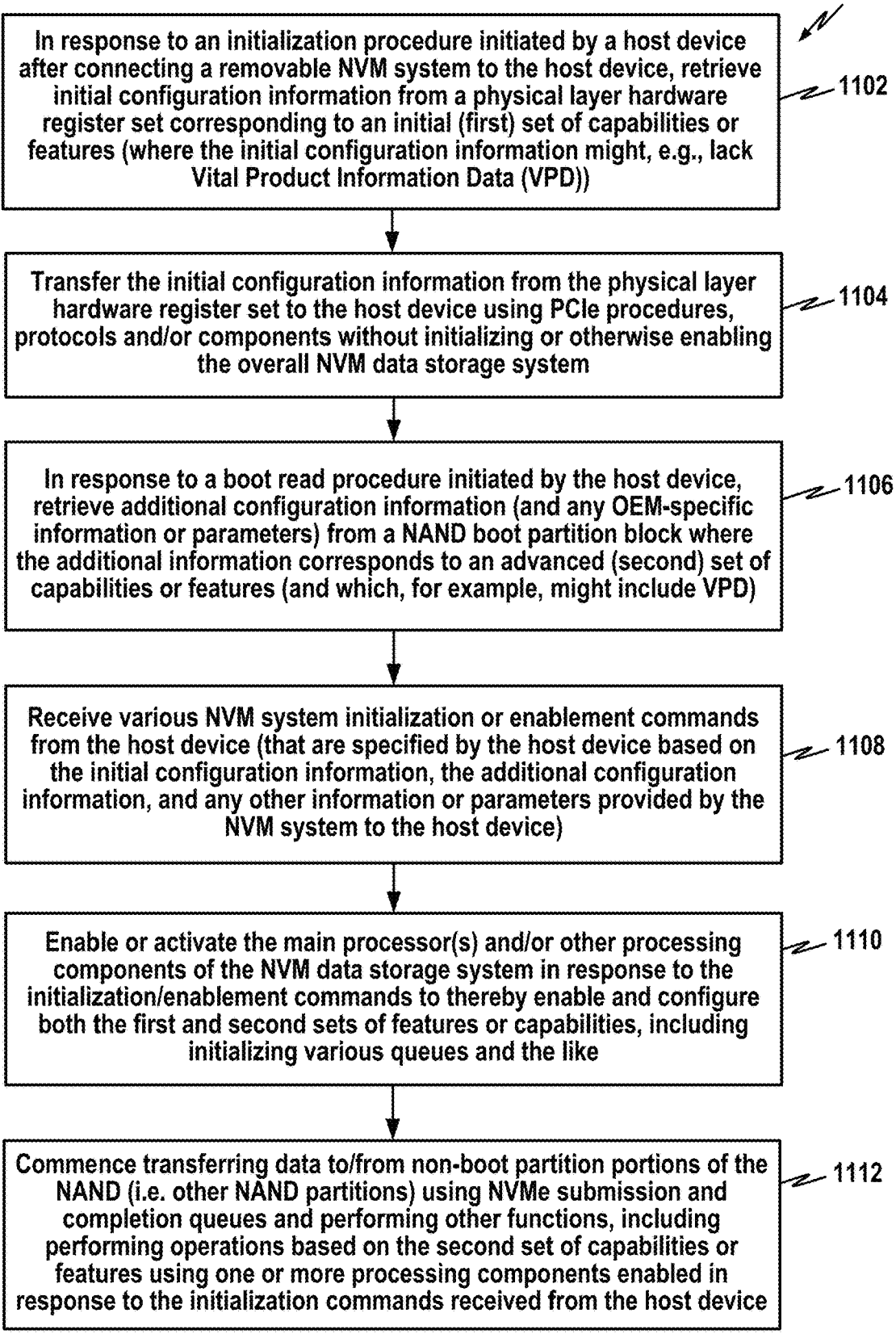
FIG. 11 is a flow chart summarizing further selected operations of a data storage controller or other suitable removable NVM data storage device configured for use with a NAND boot partition that stores additional configuration information.

FIG. 11 further summarizes exemplary operations 1100 for use by or with a data storage system having a data storage controller and NAND. At 1102, in response to an initialization procedure initiated by a host device after connecting a removable NVM system to the host device, the data storage controller retrieves initial configuration information from a physical layer hardware register set corresponding to an initial (first) set of capabilities or features (where the initial configuration information might, e.g., lack Vital Product Data (VPD)). At 1104, the data storage controller transfers the initial configuration information from the physical layer hardware register set to the host device using PCIe procedures (protocols or components) without initializing or otherwise enabling the overall NVM data storage system. At 1106, in response to a boot read procedure initiated by the host device, the data storage controller retrieves additional configuration information (and any OEM-specific information or parameters) from a NAND boot partition block where the additional information corresponds to an advance (second) set of capabilities or features (and which, for example, might include VPD). At 1108, the data storage controller receives various NVM system initialization or enablement commands from the host device (that are specified by the host device based on the initial configuration information, the additional configuration information, and any other information or parameters provided by the NVM system to the host device). At 1112, the data storage controller enables or activates the main processor(s) and/or other processing components of the NVM data storage system in response to the initialization/enablement commands to thereby enable and configure both the first and second sets of features or capabilities, including initializing various queues and the like. At 1112, the data storage controller commences transferring data to/from non-boot partition portions of the NAND (i.e. other NAND partitions) using NVMe submission and completion queues and performing other functions, including performing one or more operations based on the second set of capabilities or features using one or more processing components enabled in response to initialization commands received from the host device.

FIG. 12 summarizes exemplary operations 1200 for use by or with a host system having a removable NVM data storage system. At 1202, upon detecting the connection of the removable NVM system to the host device, the host device commences an initialization procedure to retrieve initial configuration information from the physical layer hardware register set of the NVM controller where the initial configuration information corresponding to an initial (first) set of capabilities or features. At 1204, the host device receives the initial configuration information from the physical layer hardware register set of the NVM controller using PCIe without initializing or otherwise enabling the overall NVM data storage system. At 1206, the host device initiates a boot read procedure to retrieve additional configuration information (and any OEM-specific information or parameters) from a NAND boot partition block of the NVM data storage system where the additional information corresponds to an advanced (second) set of capabilities or features (and which, for example, might include VPD). At 1208, the host device generates various NVM system initialization or enablement commands based on the initial configuration information, the additional configuration information, and any other information or parameters provided by the NVM system (where at least some of the commands may operate to fine tune or otherwise enhance the functioning of the NVM system based on the OEM-specific information). At 1210, the host device sends the commands to the NVM controller to enable the main processor(s) and/or other processing components of the NVM system and thereby enable and configure both the first and second sets of features or capabilities, including initializing queues and the like. At 1212, the host device commences reading/writing data to/from the NAND via NVMe submission and completion queues and performing other functions.

The subject matter described herein can be implemented in any suitable NAND flash memory, including 2D or 3D NAND flash memory. Semiconductor memory devices include volatile memory devices, such as DRAM) or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Furthermore, as used herein, a phrase referring to "at least one of" a list of items refers to any combination of those items, including single members. By way of example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various details of the presently disclosed subject matter may be changed without departing from the scope of the presently disclosed subject matter. Furthermore, the foregoing description is for the purpose of illustration only, and not for the purpose of limitation.

What is claimed is:

1. A method for use by a data storage system having a data storage controller and a non-volatile memory (NVM) device, comprising:
    transferring initial configuration information from a hardware component of the data storage controller to a host device;
    transferring additional configuration information from a boot partition of the NVM device to the host device;
    receiving initialization commands from the host device that are based on the initial configuration information and the additional configuration information; and
    enabling one or more processing components of the data storage system in response to the initialization commands received from the host device.

2. The method of claim 1, wherein the initial configuration information includes information identifying a first set of capabilities or features of the data storage system and wherein the additional configuration information includes information identifying a second set of capabilities or features of the data storage system.

3. The method of claim 2, wherein the initial configuration information lacks Vital Product Information Data (VPD).

4. The method of claim 2, wherein the additional configuration information includes one or more of Vital Product Information Data (VPD) and original equipment manufacturer (OEM)-specific information.

5. The method of claim 2, further comprising performing at least one operation based on the second set of capabilities or features of the data storage system using one or more of the processing components enabled in response to the initialization commands received from the host device.

6. The method of claim 1, wherein the NVM device comprises a NAND device, and wherein the boot partition of the NVM device is a NAND boot partition.

7. The method of claim 1, wherein the data storage system is a removable data storage system removably connectable to the host device.

8. A data storage system for use with a host device, comprising:
    a non-volatile memory (NVM) device configured to include a boot partition; and
    a data storage controller including
        a hardware register configured to store initial configuration information,
        a first configuration information transference controller configured to transfer the initial configuration information from the hardware register to the host device,
        a second configuration information transference controller configured to transfer additional configuration information from the boot partition of the NVM device to the host device, and
        a command reception controller configured to receive commands from the host device based on the initial configuration information and the additional configuration information.

9. The data storage system of claim 8, further comprising:
    a processing component enablement system configured to enable one or more processing components of the data storage system in response to the commands received from the host device.

10. The data storage system of claim 8, wherein the data storage controller further includes a physical layer configured for use with Peripheral Component Interconnect (PCI) Express (PCIe).

11. The data storage system of claim 10, wherein the first and second configuration information transference controllers are configured to transfer information to the host device using PCIe protocols.

12. The data storage system of claim 8, wherein the NVM device comprises a NAND device, and wherein the boot partition of the NVM device is a NAND boot partition.

13. The data storage system of claim 8, wherein the data storage system is a removable data storage system removably connectable to the host device.

14. A data storage system for use with a host device, comprising:
    a non-volatile memory (NVM) device; and
    a data storage controller configured to
        transfer initial configuration information from a hardware component of the data storage controller to the host device,
        transfer additional configuration information from a boot partition of the NVM device to the host device, receive initialization commands from the host device that are based on the initial configuration information and the additional configuration information, and enable one or more processing components of the data storage system in response to the initialization commands received from the host device.

15. The data storage system of claim 14, wherein the initial configuration information lacks Vital Product Information Data (VPD), and wherein the additional configuration information includes Vital Product Information Data (VPD).

16. The data storage system of claim 14, wherein the hardware component includes a register set formed within a physical layer of the data storage controller.

17. The data storage system of claim 14, wherein the data storage controller is further configured to execute one or more memory access requests received from the host device by accessing non-boot partition portions of the NVM device.

18. The data storage system of claim 14, wherein the NVM device comprises a NAND device.

19. The data storage system of claim 14, wherein the data storage system is a removable data storage system removably connectable to the host device.

20. The data storage system of claim 14, wherein the NVM device is configured in accordance with Non-Volatile Memory express (NVMe), and wherein the boot partition of the NVM device is an NVMe boot partition.

21. An apparatus for use in a data storage system having a data storage controller and a non-volatile memory (NVM) device, comprising:

means for transferring initial configuration information from a hardware component of the data storage controller to a host device;

means for transferring additional configuration information from a boot partition of the NVM device to the host device;

means for receiving initialization commands from the host device that are based on the initial configuration information and the additional configuration information; and means for enabling one or more processing components of the data storage system in response to the initialization commands received from the host device.

22. The apparatus of claim 21, wherein the means for transferring the initial configuration information includes means for transferring information identifying a first set of capabilities or features of the data storage system, and wherein the means for transferring the additional configuration information includes means for transferring information identifying a second set of capabilities or features of the data storage system.

23. The apparatus of claim 21, further including means for executing one or more memory access requests received from the host device by accessing non-boot partition portions of the NVM device.

* * * * *